United States Patent [19]

Weinberger

[11] Patent Number: 4,505,498
[45] Date of Patent: Mar. 19, 1985

[54] OPTICALLY-READABLE CARDS

[75] Inventor: Zvi Weinberger, Jerusalem, Israel

[73] Assignee: Teletoken Ltd., Holon, Israel

[21] Appl. No.: 418,582

[22] Filed: Sep. 15, 1982

[30] Foreign Application Priority Data

Aug. 2, 1982 [IL] Israel .................................. 66445

[51] Int. Cl.³ .............................................. B42D 15/00
[52] U.S. Cl. .................................... 283/91; 235/488;
283/904
[58] Field of Search ................... 283/91, 904; 235/480, 235/487, 488

[56] References Cited

U.S. PATENT DOCUMENTS

| | | | |
|---|---|---|---|
| 3,873,813 | 3/1975 | Lahr et al. ...................... | 235/488 X |
| 4,103,150 | 7/1978 | Von Ballmoos ................ | 235/487 X |
| 4,143,810 | 3/1979 | Greenaway ...................... | 235/487 |

Primary Examiner—Paul A. Bell
Attorney, Agent, or Firm—Benjamin J. Barish

[57] ABSTRACT

An optically-readable value card for use in a vending system for vending goods or services includes a plurality of heat-sensitive optically-readable value elements each of which, upon heating to a first temperature above ambient, changes its color in a reversible manner, but upon heating to a second temperature above ambient and higher than the first temperature, changes to a second color in an irreversible manner. Each of the value elements is in the form of a light window having a layer of a thermochromic material which changes its color in a reversible manner when heated to the first temperature, and a layer of a thermographic material which changes its color in an irreversible manner when heated to the second temperature.

11 Claims, 3 Drawing Figures

OPTICALLY-READABLE CARDS

BACKGROUND OF THE INVENTION

The present invention relates to an optically-readable value card for use in vending systems for goods or services, and also to a system including such a card.

There are many consumer goods and services which are conveniently purchased directly by the consumer using coins or special tokens. Examples of such services are telephone calls, subway or bus fares, locker rentals, and in some countries, the gas utility. Examples of goods are vending machine articles, such as newspapers, food products and the like. However, the ordinary token-operated or coin-operated systems suffer from several disadvantages. Thus, the labor and infra-structure required for collecting, counting and recycling tokens or coins is disproportionately expensive in many cases to the actual costs of the services or goods. Also, since the tokens or coins have economic value, collection boxes are subject to vandalism and theft. Because of these disadvantages, customer operated vending systems have not been expanded to allow convenient theft-free self-service at gasoline stations and other large scale consumer-oriented products.

Electronically coded value cards have been proposed to avoid the above-mentioned shortcomings of coins and tokens. Two techniques using electronic codes have been suggested. One technique relies on magnetic-tape encoding, but magnetic codes have been proven to be easily forged by methods available even in hobbyist electronic workshops. The other technique relies on expendable read-only memories (ROM) solid-state codes, but ROM memories are too expensive for low-cost services in many cases. Moreover, the state of use of such a value card is not immediately visible to the user.

Another known form of value card includes heat-sensitive optically-readable elements each representing a unit of value for the respective goods or services being vended. The optically-readable element is usually in the form of a thermographic material which is heated to effect the cancellation of the element after the respective item has been vended. Examples of this type of value card are illustrated in U.S. Pat. Nos. 3,873,813; 4,103,150 and 4,143,810.

SUMMARY OF THE INVENTION

An object of the present invention is to provide a value card of the latter type but having advantages over the known value card constructions, as will be described more particularly below. Another object of the present invention is to provide a system for vending goods or services by the use of the novel optically-readable value card.

According to one broad aspect of the present invention, there is provided an optically-readable value card for use in a vending system for vending goods or services, characterized in that said card includes one or more heat-sensitive optically-readable value elements, each of which, upon heating to a first temperature above ambient, changes an optically-discernable characteristic thereof in a reversible manner so that upon return to ambient temperature the value element returns to its initial condition to permit checking the validity of the value element, but upon heating to a second temperature above ambient and higher than said first temperature, the value element changes its said optically-discernable characteristic in an irreversible manner to signify the cancellation thereof.

In the preferred embodiments of the invention described below, each of the value elements is in the form of a light window having an optical property which is temporarily changed in a reversible manner when heated to said first temperature, and which is permanently changed in an irreversible manner when heated to said second temperature. In the preferred embodiment, each of the light windows includes a thermochromic material which changes an optically-discernable property thereof in a reversible manner when heated to said first temperature; also, each window further includes a thermographic material which changes an optically-discernable property thereof in an irreversible manner when heated to said second temperature.

According to another aspect of the present invention, there is provided a system for vending goods or services by the use of optically-readable cards as set forth above, comprising: heater means for heating the value element of said card; optical detector means for detecting the said optically-discernable characteristic of said value element; and control means effective to first heat said value element to said first temperature to check the validity of the element by detecting the required change in its optically-discernable characteristic, and upon detecting the required change, providing the requested goods or services and heating said element to said second temperature to effect the irreversible cancellation thereof.

It will be seen that the novel credit card, and the vending system using it, provide a number of important advantages over the known cards and systems. One important advantage is that the card permits the heat-sensitive value element to be first verified in a reversible manner before the item of goods or services actually is supplied. Thus, when used in a telephone system, for example, the system first verifies the validity of an available value element before permitting the customer to tie up the line by dialling the requested number; also, the system cancels the value element only if the line connection has been completed, so that if the line is engaged, for example, the value element is not cancelled. In addition, value cards constructed with the foregoing features are much more difficult to counterfeit than the conventional optically-readable value cards. If desired, the thermochromic material, and/or the thermographic material, may be applied in the form of discrete code markings, rather than as a continuous coating, to further increase the difficulty of counterfeiting.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
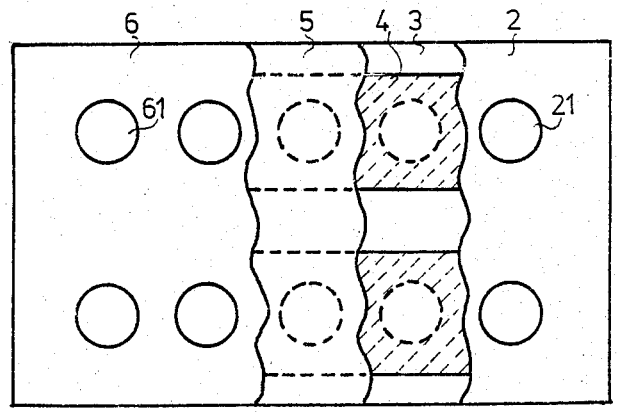
FIG. 1 illustrates the construction of one form of optically-readable card made in accordance with the present invention, portions of the illustrated card being cut-away to better show its construction.

The value card illustrated in FIG. 1 is a lamination of a plurality of layers, namely: an outer face layer 2 formed with a plurality of openings 21; a transparent layer 3 thereover of thermographic material; a transparent layer 4 thereover of thermochromic material; another transparent layer 5 thereover of thermographic material, and another outer face layer 6 formed with a plurality of openings 61 in alignment with openings 21 of face layer 2. Each of the aligned pair of openings 21, 61 thus define a light window in which is located a heat-sensitive optically-readable value element (layers 3, 4, 5) representing a unit of value with respect to the goods or services being vended. In the example illustrated in FIG. 1, the value card is formed with two horizontal rows of such light windows, five windows in each row, thereby representing a total of ten value elements.

The thermographic layers 3 and 5 are of transparent, colorless film which, upon being heated to a predetermined temperature, changes an optical characteristic of the film. Many such thermographic materials are known and could be used, such as described in U.S. Pat. Nos. 2,912,377; 2,663,654 and 3,682,684. As one example, the thermographic material for layers 3 and 5 may be silver behenate with methyl gallate, the first material melting at the predetermined temperature and reacting with the methyl gallate at about 120° C. to change from a colorless transparent film to an opaque black film. This reaction is irreversible; that is to say, once the material is heated to the predetermined temperature, in this case 120° C., and turns black, it will remain black even though the material returns to ambient temperature.

The thermochromic material of layer 4, applied between the two layers 3 and 5 of thermographic material, undergoes a different change when heated. Thus, the thermochromic material of layer 4 has the property of changing an optically-discernable characteristic thereof in a reversible manner when heated to a predetermined temperature above ambient. One suitable material that may be used is cuprous mercuric iodide ($Cu_2HgI_4$), this material being red at ambient temperatures and temporarily (i.e., reversibly) turning black at about 70° C. It permanently (i.e., irreversibly) turns opaque white (or yellow) at about 1270° C., and decomposes at about 220° C., but this characteristic of the material is not involved in the use of the value card illustrated in FIG. 1. Many other thermochromic materials are known, for example in the temperature-measuring fields, and may be used.

The important characteristic of the thermochromic material, when used as layer 4 in the card illustrated in FIG. 1, is that at ambient temperatures this thermochromic material is red and is viewable through the window of the aligned openings 21, 61 in the face layers 2 and 6, and also through the transparent layers 3 and 5 of thermographic material; but when the respective window is heated to 70° C., the thermochromic material of layer 4 in the respective window changes from red to black. When so changed, it is still viewable through the openings 21, 61 and the transparent thermographic layers 3 and 5. This color change in the thermochromic layer 4 is reversible, i.e., if the respective window of the card returns to a temperature below 70° C., the thermochromic layer 4 will return to its original red color, provided of course it had not been heated to the permanent transition temperature of about 220° C. If, however, the respective window has been heated to a temperature of 120° C. or above, the thermographic material of layers 3 and 5 of the respective window will have undergone permanent color transition, from colorless transparency to opaque black, so that the respective window will also appear black.

The reversible transition of the thermochromic layer 4 from red to black, when heated to 70° C., is used for making a validity check of the respective value element represented by the respective window; and the transition of the thermographic material of layers 3 and 5 when heated to a temperature of 120° C. is used for effecting the cancellation of the respective value element.

The face layers 2 and 6 of the card illustrated in FIG. 1 may be made of any suitable material, such as cardboard, plastic, or paper; the thermographic layers 3 and 5 are preferably in the form of colorless, transparent film commercially available today; and the thermochromic material of layer 4 is preferably in the form of two parallel strips of film, each strip being applied over the thermographic film layer 3 to overlie one row of the openings 21 in face layer 2. The card illustrated in FIG. 1 is produced by laminating the foregoing layers together with adhesive.

Figure 2:
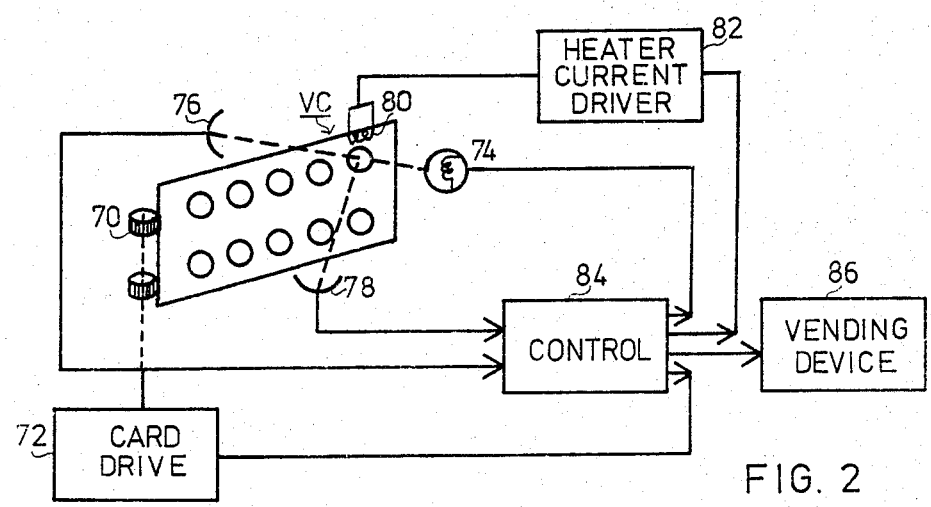
FIG. 2 illustrates the use of the card of FIG. 1 in a system for vending goods or services.

FIG. 2 illustrates the manner of using the value card constructed as described above with respect to FIG. 1.

Thus, the value card, generally designated VC in FIG. 2, is used with equipment which includes a pair of feeding wheels 70 driven by a mechanical drive 72, for feeding the card into an examination station in the apparatus. At the examination station are located a light source 74, such as a light-emitting diode (LED) at the front side of the card, an optical detector 76 at the back side of the card for detecting transmitted light, another optical detector 78 at the front side of the card for detecting reflected light, and a heating element 80 supplied by a heating current driver 82. All the foregoing elements are controlled by a control unit 84, which unit also controls a vending device 86.

The system illustrated in FIG. 2 operates as follows.

The value card VC is manually inserted into the vending apparatus, for example, a telephone, and is fed by rollers 70 to bring the first uncancelled value element (represented by a pair of openings 21, 61 in the face layers 2, 6) to the examination station in alignment with the light source 74 and the heating element 80. The heating element 80 is then energized to heat the window to a first temperature, e.g., about 70° C. or slightly above, at which temperature the thermochromic layer 4 (FIG. 1) in alignment with the respective window changes its color, in this case from red to black. This change in color is detected by the detectors 76 and/or 78 on the opposite sides of the card, as a result of the illumination of the window by the light source 74. The information from the two detectors 76, 78 is fed to the control unit 84, so that if the required color change is detected, the control unit then controls the heating current driver 82 to cause the latter to heat the window in the examination station to a higher temperature, e.g., about 110° C. or slightly above. At this higher temperature, the thermographic transparent material of layers 3 and 5 within the window at the examination station turns black, to effect a cancellation of the value element represented by the respective window.

It will thus be seen that heating the respective window to the first temperature, about 70° C., changes the optical characteristic of the window (the color) in a reversible manner, in that the thermochromic material 4 which is changed from red to black at the heating temperature of 70° C. will change back to red if the heat is removed. This reversible change in the optical characteristic of the heat-sensitive window is used for checking the validity of the value element represented by the respective window, and if found valid, the system can then proceed to the second heating stage wherein the window is heated to a higher temperature to effect an irreversible change in the optical characteristic of the window, namely, the rendition of the thermographic material of layers 3 and 5 from transparent to opaque black, to effect the cancellation of the respective value element with the vending of the respective goods or service.

Thus, if the value vard is used in place of telephone tokens, for example, the validity check at the lower temperature (70° C.) may be made before the user is connected to the line for dialling; and after the user dials the requested number and obtains a line connection, the window may be heated to the second temperature for making the irreversible change in the optical characteristic of the window to effect the cancellation of the value element. However, should the line connection not be completed, the heater 80 would not be energized to the higher temperature (about 110° C.). Thus, the respective value element would not be cancelled in an irreversible manner, but rather would return to its original condition so that it would be available for use again.

The illustrated arrangement is thus particularly suited for enabling a validity check of the value element to be made before the user is actually supplied with the item of service or goods. Another advantage in the illustrated arrangement is that it is also considerably more difficult to counterfeit than previously-known optical cards, involving merely a one-stage heating of the card without any pre-validation of the card in a manner not effecting an irreversible change in the value element.

Figure 3:
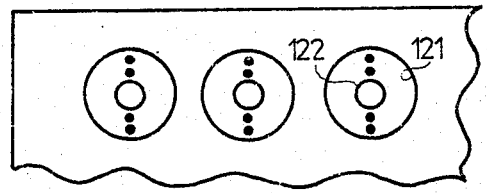
FIG. 3 illustrates a modification in the construction of the optically-readable card illustrated in FIG. 1.

FIG. 3 illustrates a variation wherein the heat-sensitive, optically-readable value elements of the card are not in the form of continuous coatings or layers, as in the FIGS. 1,2 embodiment, but rather are in the form of discrete code markings. The code markings can be applied, for example, according to known printing techniques. Such an arrangement is particularly useful in order to further increase the difficulty of counterfeiting.

Thus, as shown in FIG. 3, the value card is formed with a plurality of windows 121, as in the FIGS. 1,2 embodiment. Each window also includes two heat-sensitive layers, namely, one or two thermographic layers corresponding to layers 3 and 5 in FIG. 1, and a thermochromic layer corresponding to layer 4 in FIG. 1. The thermochromic layer is applied in the form of discrete code markings, as shown at 122 in FIG. 3, corresponding to a predetermined code, in this case two solid spots separated by an annular spot. It will be appreciated, however, that any desired code marking may be applied.

The card illustrated in FIG. 3 would be used in the same manner as described above with respect to the card of FIGS. 1 and 2, except that one or both of the optical detectors (76, 78 in FIG. 2) would be in a form capable of detecting the particular code used, for example in the form of a linear array of photodetectors. By applying the code markings to the thermochromic layer, which as described above reversibly changes its optical characteristics when heated to the first temperature for purposes of validating the value item of the card, the thermochromic material (layer 4 in FIG. 1) and thermographic material (layers 3, 5 in FIG. 1) may be selected so that the user is not able to see the code markings either before use of the card or after cancellation of the respective credit item, thereby increasing the difficulty of counterfeiting.

Instead of having the thermochromic material in the form of the discrete code markings 122, it is contemplated that the thermographic material (corresponding to layers 3 and 5 in FIG. 1) may also be applied in the form of discrete code markings, with or without the presence of the thermochromic material. Thus, if the thermographic material is applied in the form of code markings and is used together with the thermochromic layer, the latter can serve to effect the validity check of the value element in a reversible manner as described above, whereas the thermographic material can serve to effect the cancellation of the value element, also as described above, except that in this case, by applying the thermographic material in the form of code markings, the difficulty of counterfeiting is increased. It is also contemplated that in this modification, the thermochromic material may be omitted, and by this, there will also be omitted the capability of providing the pre-validity check in a reversible manner.

Further, the irreversible change may be effected by melting or burning of a plastic layer rather than by the use of thermographic material.

Many other variations, modifications and applications of the invention may be made.

What is claimed is:

1. An optically-readable value card for use in a vending system for vending goods or services, characterized in that said card includes one or more heat-sensitive optically-readable value elements each of which, upon heating to a first temperature above ambient, changes an optically-discernable characteristic thereof in a reversible maner so that upon return to ambient temperature the value element returns to its initial condition, to permit checking the validity of the value element, but upon heating to a second temperature above ambient and higher than said first temperature, the value element changes its said optically-discernable characteristic in an irreversible manner to signify the cancellation thereof.

2. The card according to claim 1, wherein each of said value elements is in the form of a light window having an optical property which is temporarily changed in a reversible manner when heated to said first temperature, and which is permanently changed in an irreversible manner when heated to said second temperature.

3. The card according to claim 2, wherein each of said light windows is reversibly changed to a first color when heated to said first temperature and is irreversibly changed to a second color when heated to said second temperature.

4. The card according to claim 1, wherein each of said light windows includes a thermochromic material which changes an optically-discernable property thereof in a reversible manner when heated to said first temperature.

5. The card according to claim 4, wherein said thermochromic material change its color in a reversible manner when heated to said first temperature.

6. The card according to claim 4, wherein each of said light windows further includes a thermographic material which changes an optically-discernable property thereof in an irreversible manner when heated to said second temperature.

7. The card according to claim 6, wherein said thermographic material is initially transparent and becomes opaque when heated to said second temperature.

8. The card according to claim 4, wherein said thermochromic material is cuprous mercuric iodide.

9. The card according to claim 4, wherein said thermochromic material is in the form of a continuous coating.

10. The card according to claim 4, wherein said thermochromic material is in the form of discrete code markings.

11. The card according to claim 6, wherein said thermographic material is in the form of discrete code markings.

* * * * *